United States Patent
Nishioka

(10) Patent No.: US 8,730,405 B2
(45) Date of Patent: May 20, 2014

(54) DISPLAY APPARATUS, REMOTE CONTROLLER, DISPLAY CONTROL METHOD, AND CONTROL METHOD

(75) Inventor: Yoshio Nishioka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1152 days.

(21) Appl. No.: 12/258,171

(22) Filed: Oct. 24, 2008

(65) Prior Publication Data

US 2009/0122079 A1    May 14, 2009

(30) Foreign Application Priority Data

Nov. 9, 2007  (JP) ................................. 2007-292358

(51) Int. Cl.
*H04N 5/44* (2011.01)

(52) U.S. Cl.
USPC ........... 348/734; 348/706; 348/723; 348/725; 348/736; 348/738; 348/656; 348/563; 348/564; 348/565; 348/569; 348/581; 348/584; 348/588; 348/591; 348/14.05; 348/114; 348/211.99; 340/12.22; 340/4.11; 340/815.6; 341/34; 341/176; 345/169; 715/740; 715/830

(58) Field of Classification Search
USPC ......... 348/734, 14.05, 114, 211.99, 563, 564, 348/565, 569, 581, 584, 588, 591, 656, 706, 348/723, 725, 736, 738; 341/34, 176; 340/12.22, 4.11, 815.6; 345/169; 715/830, 740
See application file for complete search history.

(56) References Cited

U.S. PATENT DOCUMENTS

| | | | |
|---|---|---|---|
| 6,208,271 B1* | 3/2001 | Armstrong ...................... | 341/34 |
| 6,509,848 B1* | 1/2003 | Ogata et al. ..................... | 341/34 |
| 7,190,345 B2* | 3/2007 | Nashida et al. ................ | 345/156 |
| 7,206,029 B2* | 4/2007 | Cohen-Solal ................. | 348/565 |
| 8,239,784 B2* | 8/2012 | Hotelling et al. ............. | 715/830 |
| 2002/0070957 A1* | 6/2002 | Trajkovic et al. ............. | 345/719 |
| 2002/0140862 A1* | 10/2002 | Dimitrova et al. ............ | 348/565 |
| 2005/0097341 A1* | 5/2005 | Francis et al. ................ | 713/189 |
| 2006/0026535 A1* | 2/2006 | Hotelling et al. ............. | 715/863 |
| 2006/0125968 A1* | 6/2006 | Yokozawa et al. ............ | 348/734 |
| 2007/0217650 A1* | 9/2007 | Ota et al. ....................... | 382/100 |
| 2007/0290876 A1* | 12/2007 | Sato et al. ................ | 340/825.22 |

FOREIGN PATENT DOCUMENTS

| | | |
|---|---|---|
| JP | 08-111828 A | 4/1996 |
| JP | 2001-320783 A | 9/2001 |
| JP | 2006-157684 A | 6/2006 |
| JP | 2006-222513 A | 8/2006 |

* cited by examiner

*Primary Examiner* — Jefferey Harold
*Assistant Examiner* — Mustafizur Rahman
(74) *Attorney, Agent, or Firm* — Canon USA, Inc., IP Division

(57) ABSTRACT

In order to display selected content as desired by a viewer by performing an easy operation without interrupting current viewing, a display apparatus includes a reception unit for receiving from a remote controller for transmitting an operation instruction to the display apparatus operation information including the amount of operation of a selection member which is detected at the time of selecting content and identification information identifying selected content, a determination unit for determining an output attribute of the selected content identified using the identification information based on the amount of operation, an output image generation unit for generating an output image of the selected content based on the output attribute determined by the determination unit, and a display control unit for displaying the output image generated by the output image generation unit.

20 Claims, 13 Drawing Sheets

FIG. 11

| OPERATION AMOUNT | VIEWED CONTENT (%) | SELECTED CONTENT (%) |
|---|---|---|
| VALUES FROM 0.0 (INCLUSIVE) TO 0.1 (EXCLUSIVE) | 100 | 0 |
| VALUES FROM 0.1 (INCLUSIVE) TO 0.3 (EXCLUSIVE) | 80 | 20 |
| VALUES FROM 0.3 (INCLUSIVE) TO 0.5 (EXCLUSIVE) | 50 | 50 |
| VALUES FROM 0.5 (INCLUSIVE) TO 0.9 (EXCLUSIVE) | 20 | 80 |
| VALUES FROM 0.9 TO 1.0 (BOTH INCLUSIVE) | 0 | 100 |

DISPLAY APPARATUS, REMOTE CONTROLLER, DISPLAY CONTROL METHOD, AND CONTROL METHOD

BACKGROUND OF THE INVENTION

1. Field of the Invention

The present invention relates to a display apparatus and a remote controller.

2. Description of the Related Art

Display apparatuses such as television receivers are widely used. A display apparatus receives an analog/digital broadcast, or receives content from an external terminal and displays images based on the received content (input content). As digitalization of broadcasts proceeds, the number of channels that can be received by a display apparatus enormously increases. There are various external input apparatuses for receiving input content such as recorders including video recorders, hard disk recorders, and DVD recorders, DVD players, home video game machines, and digital cameras.

Display apparatuses are generally provided with a remote controller for performing communication using infrared light. A user (viewer) switches channels or selects one of pieces of input content by pressing one of buttons formed on the remote controller. For example, if a user presses one of twelve channel selection buttons corresponding to analog terrestrial broadcast stations, a broadcast viewable on a selected channel is displayed on a screen of a display apparatus instead of a broadcast viewable on a current channel. There are display apparatuses for multichannel digital broadcasting in which an EPG (Electronic Program Guide) is displayed using a GUI on a screen. In the case of such display apparatuses, a user selects a desired one of channels included in an EPG with a remote controller.

A viewer can select a desired piece of content from among pieces of content of an enormous number of channels or various input sources by performing channel surfing with a remote controller. Here, channel surfing means that a viewer changes channels quickly with a remote controller while watching, for example, television on a display apparatus.

On the other hand, there are display apparatuses having a double-screen display function of simultaneously displaying a main screen and a subscreen based on two different image signals that are received by a plurality of tuners or input from a plurality of external input apparatuses. Furthermore, there are display apparatuses having a picture-in-picture function of displaying one picture as a main screen in the entire screen area and the other picture as a subscreen in a part of the screen area of the main screen.

In a display apparatus having the double-screen display function or the picture-in-picture function, there is a relationship of master and servant between two screens. One of the two screens can be operated by a viewer and is allowed to output sound. In contrast, the other one of the two screens cannot be directly operated by the viewer and is not allowed to output sound. An operation button such as a screen switching button is prepared on a remote controller so as to allow a viewer to change an operable screen functioning as a master between the two screens.

In such a display apparatus having the double-screen display function or the picture-in-picture function, a viewer can use one of two screens for viewing and the other one for channel surfing.

In such a display apparatus having the double-screen display function or the picture-in-picture function, the display sizes and display positions of the two screens are generally fixed in advance. On the other hand, for example, Japanese Patent Laid-Open No. 08-111828 discloses a technique for easily changing a display setting.

In the case of the technique disclosed in Japanese Patent Laid-Open No. 08-111828, a plurality of different double-screen display patterns are prepared in advance. The switching among these display patterns can be easily performed using a single input key.

Japanese Patent Laid-Open No. 2001-320786 discloses a technique for freely setting a display setting to a user's desired level by continuously changing a display attribute with a directional key of a remote controller.

Japanese Patent Laid-Open No. 2006-157684 discloses a technique for achieving the easy operation of a remote controller by causing each of a search button, a playback button, and a stop button of a remote controller to have many functions.

However, in the case of the above-described techniques in the related art, a viewer cannot perform channel surfing smoothly while continuing viewing.

As described previously, in a display apparatus in the related art, if a channel selection button of a remote controller is pressed, viewing of a current channel is interrupted so as to change a channel. In particular, in a display apparatus supporting an enormous number of channels in which it is required to perform a plurality of button pressing operations at the time of selecting a channel, if another channel is being checked while a current channel is being viewed, a good scene of the current channel may be missed. For example, it is required to perform a plurality of button pressing operations at the time of selecting a channel from an EPG or switching between an analog broadcasting channel and a digital broadcasting channel.

In a display apparatus capable of simultaneously displaying two screens, viewing of a current channel is not interrupted. However, since the display sizes and display positions of two screens are fixed, a viewer cannot change the display settings of the two screens in accordance with the level of importance of each channel. For example, the level of importance is the degree of interest in the program of each channel, the degree of interest in one channel relative to the other channel, or a viewing environment in which there is a single viewer or a group of viewers.

For example, if a double-screen display mode is set so as to check another channel while a movie or a sport program is being viewed in a full-screen display mode, a screen on which the movie or the sport program is displayed is reduced in size. This reduces realism. Accordingly, it is required to allow the display settings of two screens, for example, the display sizes and display positions of two screens, to be easily changed. In the above-described techniques in the related art, it is required to perform a button pressing operation a plurality of times separately from a channel selection operation so as to change a display setting.

SUMMARY OF THE INVENTION

The present invention provides a display apparatus and a remote controller capable of easily displaying selected content as desired by a viewer without interrupting current viewing.

A display apparatus according to an embodiment of the present invention includes a reception unit configured to receive from a remote controller for transmitting an operation instruction to the display apparatus operation information including the amount of operation of a selection member which is detected at the time of selecting content and identification information identifying selected content, a determination unit configured to determine an output attribute of the selected content identified using the identification information based on the amount of operation, the identification information and the amount of operation being included in the operation information received by the reception unit, an output image generation unit configured to generate an output image of the selected content based on the output attribute determined by the determination unit, and a display control unit configured to display the output image generated by the output image generation unit.

A remote controller according to an embodiment of the present invention is used to transmit an operation instruction to a display apparatus. The remote controller includes a content selection unit configured to select a piece of content from among pieces of content displayed by the display apparatus in accordance with a user's operation of a selection member, an operation amount detection unit configured to detect the amount of operation of the selection member, and a transmission unit configured to transmit to the display apparatus operation information including the amount of operation detected by the operation amount detection unit and identification information identifying content selected by the content selection unit.

A display control method according to an embodiment of the present invention is for a display apparatus, and includes receiving from a remote controller for transmitting an operation instruction to the display apparatus operation information including the amount of operation of a selection member which is detected at the time of selecting content and identification information identifying selected content, determining an output attribute of the selected content identified using the identification information based on the amount of operation, the identification information and the amount of operation being included in the operation information received in the receiving step, generating an output image of the selected content based on the output attribute determined in the determining step, and displaying the output image generated in the generating step.

A control method according to an embodiment of the present invention is for a remote controller for transmitting an operation instruction to a display apparatus, and includes selecting a piece of content from among pieces of content displayed by the display apparatus in accordance with a user's operation of a selection member, detecting the amount of operation of the selection member, and transmitting to the display apparatus operation information including the amount of operation detected in the detecting step and identification information identifying content selected in the selecting step.

According to an embodiment of the present invention, selected content can be displayed as desired by a viewer by performing an easy operation without interrupting current viewing.

Further features of the present invention will become apparent from the following description of exemplary embodiments with reference to the attached drawings.

BRIEF DESCRIPTION OF THE DRAWINGS

FIG. 11 is a diagram illustrating an example of a table providing the relationship between the pressing amount of a content selection button and the output sound volume ratio between content being viewed and selected content.

DESCRIPTION OF THE EMBODIMENTS

Embodiments of the present invention will be described with reference to the accompanying drawings.

First Embodiment

A display system according to this embodiment includes a television receiver (display apparatus) and a remote controller with a content selection button having a pressure sensor. The content selection button is an example of a selection member. If two pieces of content are displayed, the television receiver controls the transparency of one of them so as to superimpose it on the other one of them. A display system according to this embodiment changes the transparency of a specified content image in accordance with the pressing amount of the content selection button which is detected by the pressure sensor so as to display the specified content image.

[Overall Configuration of Display System]

Figure 1:
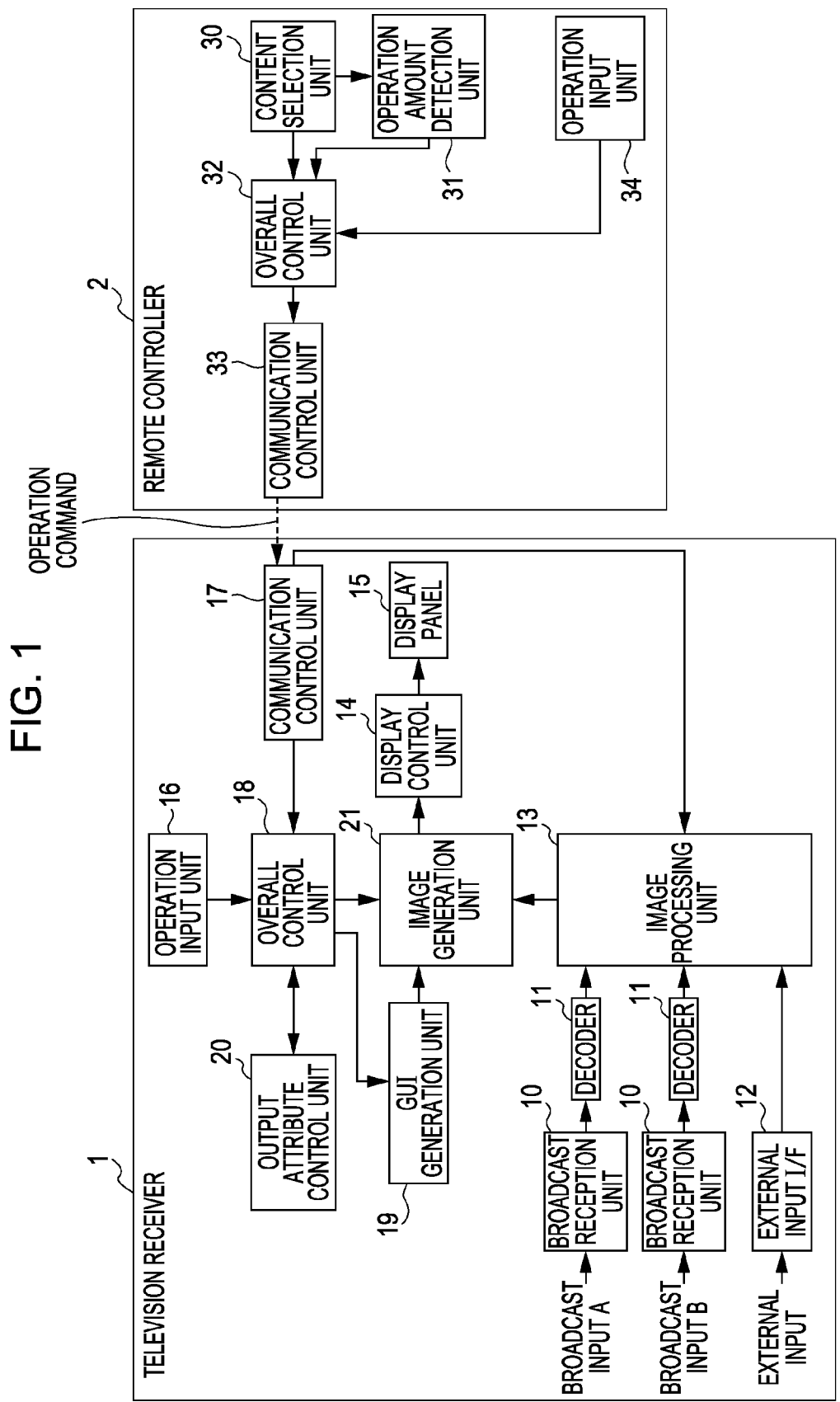
FIG. 1 is a block diagram illustrating an example configuration of a display system according to a first embodiment.
Figure 2:
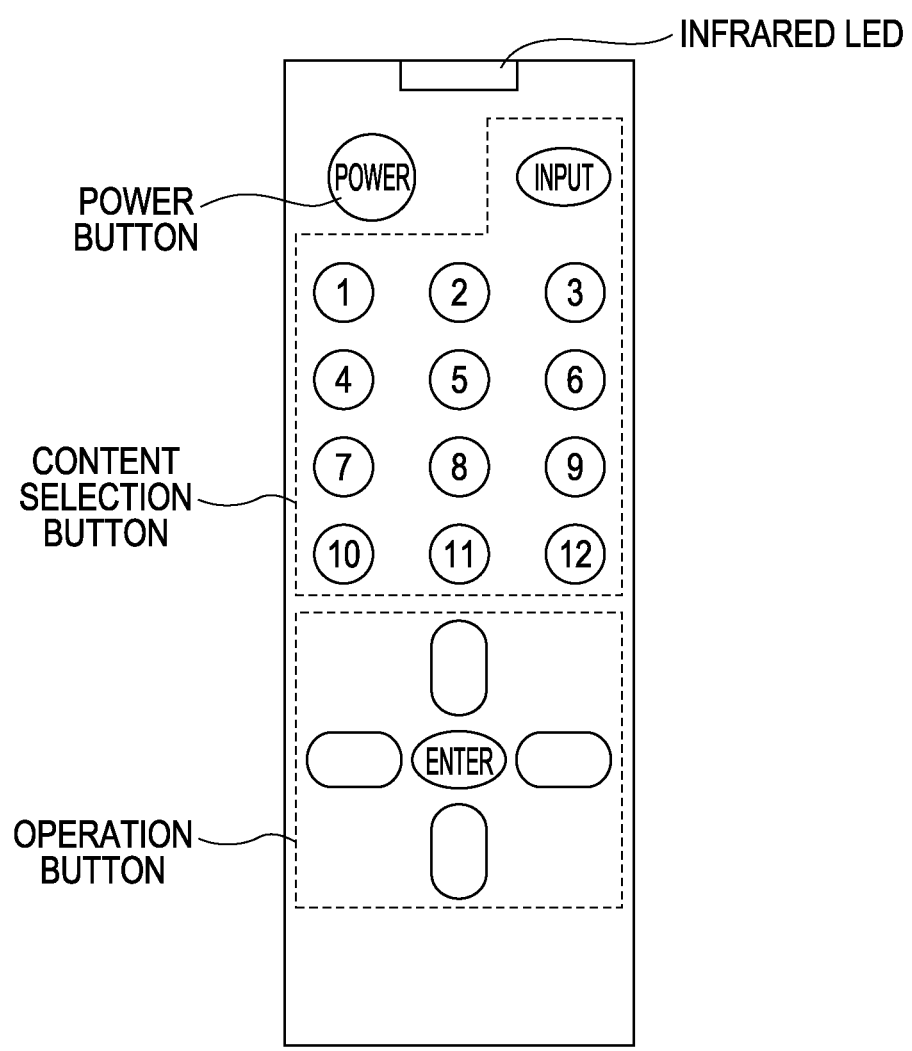
FIG. 2 is a schematic view of a remote controller.
Figure 3:
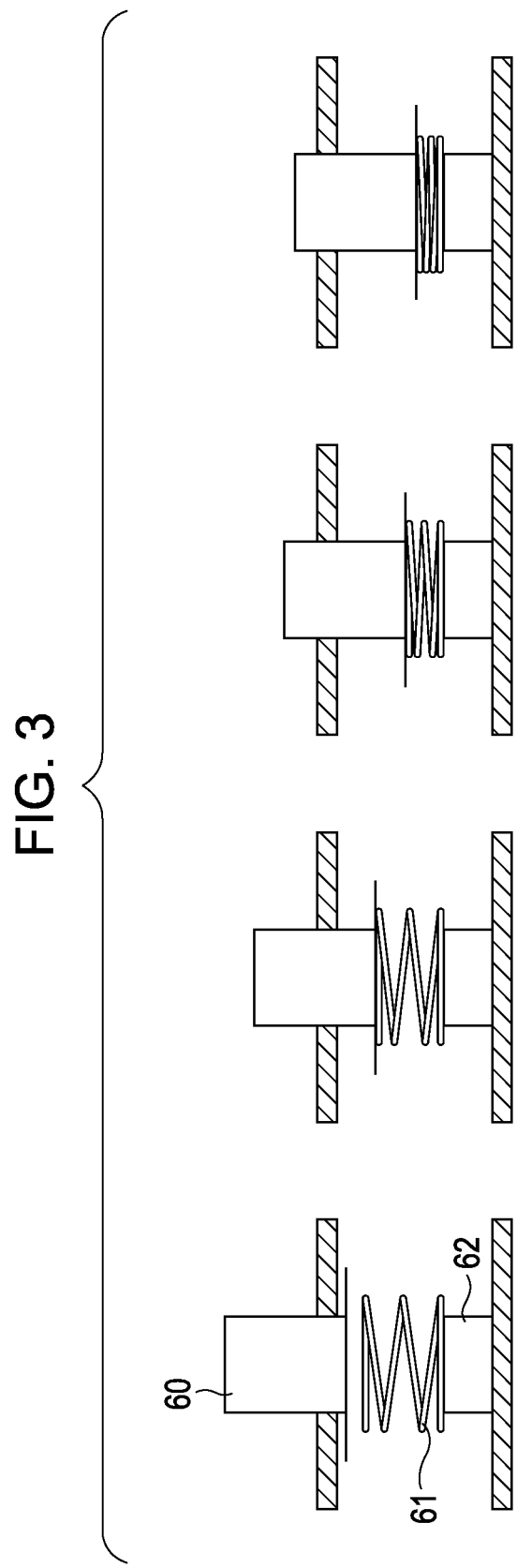
FIG. 3 is a diagram describing an example structure of a content selection button.

FIG. 1 is a block diagram illustrating the configuration of a display system according to the first embodiment. FIG. 2 is a schematic view of a remote controller. FIG. 3 is a diagram describing the structure of a content selection button.

First, the configuration of a display system according to this embodiment will be described. A television receiver 1 receives a plurality of digital broadcasts and a plurality of analog broadcasts so as to display TV program content. The television receiver 1 also displays content input from an external input terminal. A remote controller 2 transmits an operation instruction and information about the amount of operation to the television receiver 1 via a communication path.

As illustrated in FIG. 2, the remote controller 2 includes a content selection button portion including selection buttons and an input switching button, a power button, an operation button portion used for the setting of sound volume, and an infrared LED for emitting infrared light.

The internal configuration of the remote controller 2 will be described below. Referring back to FIG. 1, a content selection unit 30 receives an input from a content selection button with which a viewer selects a channel or performs various input switching operations. An operation amount detection unit 31 detects the pressing amount of the content selection button using a pressure sensor included in the content selection button. An overall control unit 32 includes a CPU, a ROM, and a RAM, and performs the overall control of the remote controller 2. A communication control unit 33 communicates with the television receiver 1. An operation input unit 34 receives an input from a power button or an operation button.

The structure of the content selection unit 30 and the operation amount detection unit 31 will be described with reference to FIG. 3. For example, a button 60 is made of a rubber pad. Under the button 60, a spring 61 is disposed. The spring 61 is in contact with a pressure sensor 62 formed on a contact pattern for each button. If the button 60 is pressed, a pressure is applied to the pressure sensor 62. As a result, the pressure sensor 62 determines that the button 60 has been pressed. At the same time, the amount of pressure applied to the pressure sensor 62 is changed in accordance with the pressing amount of the button 60, that is, the amount of compression of the spring 61. The pressure sensor 62 (or the operation amount detection unit 31) detects this change as the amount of operation.

The internal configuration of the television receiver 1 will be described below. A broadcast reception unit 10 performs stream analysis upon a received broadcast wave so as to obtain video stream data. A decoder 11 decodes the video stream data. For example, the decoder 11 performs decoding for various formats such as MPEG2 and H.264. In this embodiment, the television receiver 1 can simultaneously receive two broadcast waves and display these broadcasts. An external input interface 12 receives transmitted content data compliant with a transmission standard such as HDMI, DVI, or D-terminal. An image processing unit 13 performs various corrections such as a color correction and an edge correction. A display control unit 14 performs control processing so as to display an image on a display panel 15. The display control unit 14 generates a driving signal for the display panel 15, and outputs video data read from a VRAM (not illustrated) in synchronization with the driving signal. The display panel 15 is a display apparatus for displaying various images such as broadcast content and an image for an operation GUI. The display panel 15 may be a panel for any format, for example, CRT, LCD, plasma, projection, or SED. Although not illustrated in the drawing, audio data is processed in the same manner as video data and is then output from a speaker (not illustrated).

The overall control of the television receiver 1 and image generation processing will be described below. An operation input unit 16 receives an operation instruction input by a user. The operation input unit 16 includes various operation keys such as a power key, a channel selection key, and a volume control key and an input circuit. A communication control unit 17 communicates with the remote controller 2 using any communication method, for example, an infrared communication method or a wireless communication method. An overall control unit 18 includes a CPU, a ROM, and a RAM, and performs control processing of each unit included in the television receiver 1 in response to an instruction transmitted from the remote controller 2 via the communication control unit 17 or an instruction received by the operation input unit 16.

A GUI generation unit 19 generates a graphic image for an operation GUI in response to an instruction transmitted from the overall control unit 18. An output attribute control unit 20 determines the output attribute of a content image. The output attribute control unit 20 receives information about the amount of operation detected by the operation amount detection unit 31 included in the remote controller 2 and calculates a transparency based on the received information.

Figure 4:
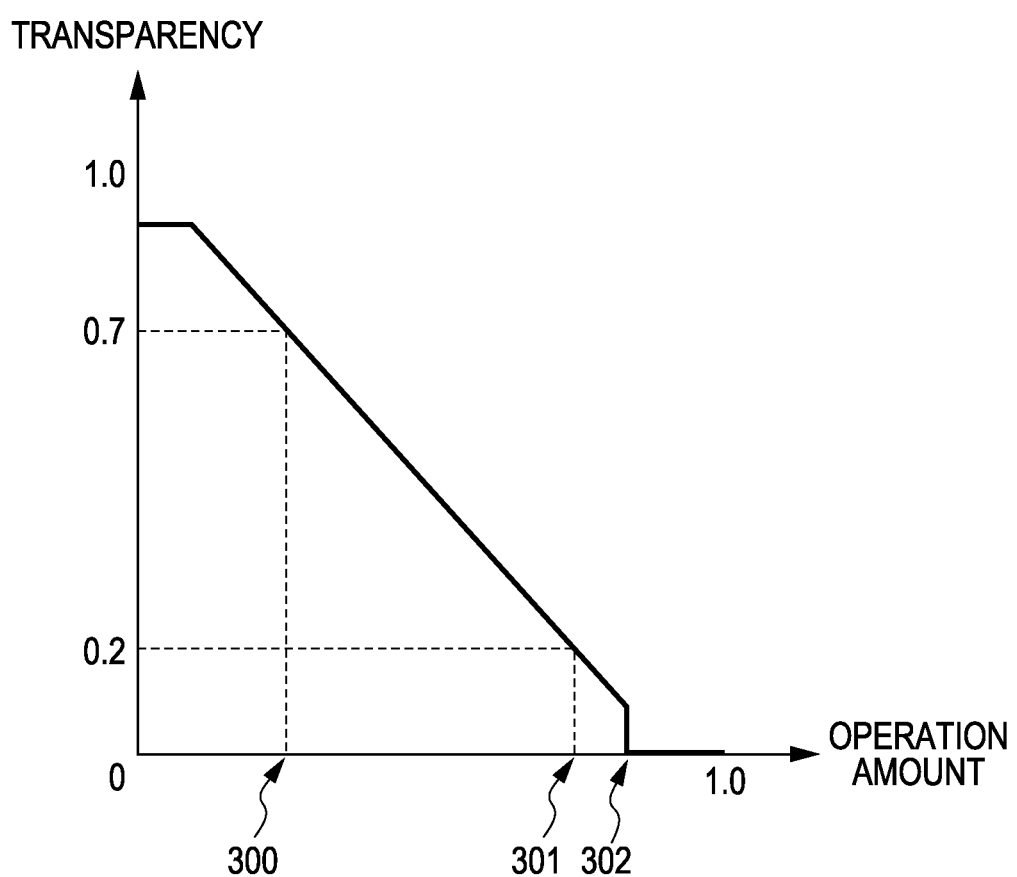
FIG. 4 is a diagram illustrating the relationship between the amount of operation and a transparency.

A transparency calculation method according to this embodiment will be described with reference to FIG. 4. FIG. 4 is a graph (diagram) illustrating the relationship between the amount of operation and a transparency. For example, by giving characteristics illustrated in the drawing to the output attribute control unit 20, a transparency can be continuously changed in proportion to the amount of operation. Referring to FIG. 4, if the operation amount of 300 is detected, the output attribute control unit 20 calculates the transparency of 0.7. If the operation amount of 301 is detected, the output attribute control unit 20 calculates the transparency of 0.2. The calculated transparency is transmitted to an image generation unit 21 via the overall control unit 18. Referring to FIG. 4, the operation amount of 302 is set as a threshold value. If the operation amount of 302 is detected, the output attribute control unit 20 notifies the overall control unit 18 that the selection of content has been performed.

Referring back to FIG. 1 again, the image generation unit 21 performs combining of a GUI image and a content image or combining of a plurality of content images based on an instruction and a transparency which are transmitted from the overall control unit 18, and generates image data so as to display an image on a display panel. For example, if an instruction to display a broadcast input A is transmitted from the overall control unit 18, the image generation unit 21 selects video data corresponding to the broadcast input A from among outputs of the image processing unit 13 so as to generate image data. For example, if an instruction to display the broadcast input A and a broadcast input B is transmitted from the overall control unit 18 while the broadcast input A is displayed, the image generation unit 21 selects video data corresponding to the broadcast input A and video data corresponding to the broadcast input B from among the outputs of the image processing unit 13. Subsequently, the image generation unit 21 superimposes the video data corresponding to the broadcast input B on the video data corresponding to the broadcast input A in accordance with a specified transparency so as to generate image data.

Example of Changing Transparency of Selected Content Image

Figure 5:
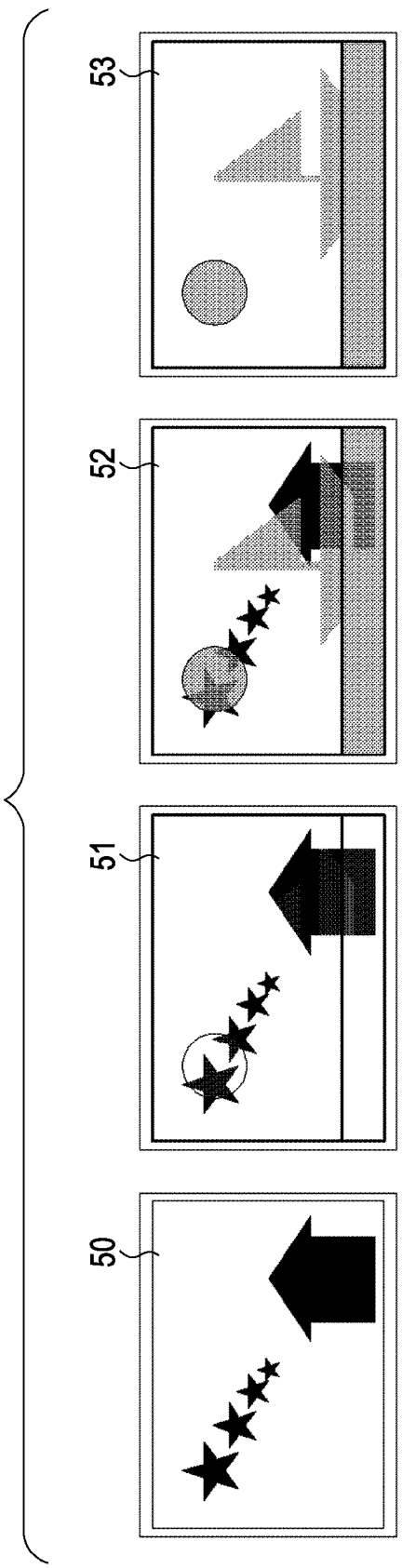
FIG. 5 is a diagram illustrating the transition of a display screen of a television receiver which is occurred in accordance with the change in the pressing amount of a content selection button.

First, exemplary display screens of the television receiver 1 which are obtained when the transparency of a selected content image is changed will be described. FIG. 5 is a diagram illustrating the transition of a display screen of a television receiver which is occurred in accordance with the change in the pressing amount of a content selection button.

An image 50 illustrates a state in which content being viewed is displayed in the entire screen area. An image 51 illustrates a state of a screen displayed when a content selection button for content different from the content being viewed is pressed lightly in the state of the image 50. Specified content is superimposed on the content being viewed in accordance with a transparency.

An image 52 illustrates a state of a screen displayed when the content selection button is further pressed from the state of the image 51. The specified content becomes darker than that displayed in the image 51. If the pressing of the content selection button is eased in the state of the image 52, the specified content becomes lighter.

An image 53 illustrates a state in which the content selection button is further pressed from the state of the image 52 so as to perform selection of the specified content. The selected content is displayed instead of the content displayed in the images 50 to 52. This operation corresponds to a channel selection operation of the television receiver 1 in the related art.

If the pressing of the content selection button is released in the state of the image 51 or 52, the screen is back to the state of the image 50 in which only the content being viewed is displayed. Thus, in this display system, since the state of the display screen is changed in accordance with the pressing amount of the content selection button, the selected content can be displayed as desired by a viewer. For example, if a viewer wants to check another piece of content different from a piece of content being viewed, the viewer can check another piece of content without stopping current viewing by pressing a corresponding content selection button lightly. Furthermore, the viewer can apply a stronger pressing force to the content selection button when checking another piece of content with certainty. When the viewer wants to view another piece of content instead of the piece of content being viewed, the viewer can watch another piece of content by pressing the corresponding content selection button all the way down. On the other hand, if the viewer is not interested in another piece of content after checking it, the viewer can continue the current viewing by releasing the pressing of the content selection button.

[Overall Control Process Performed by Remote Controller 2]

Figure 6:
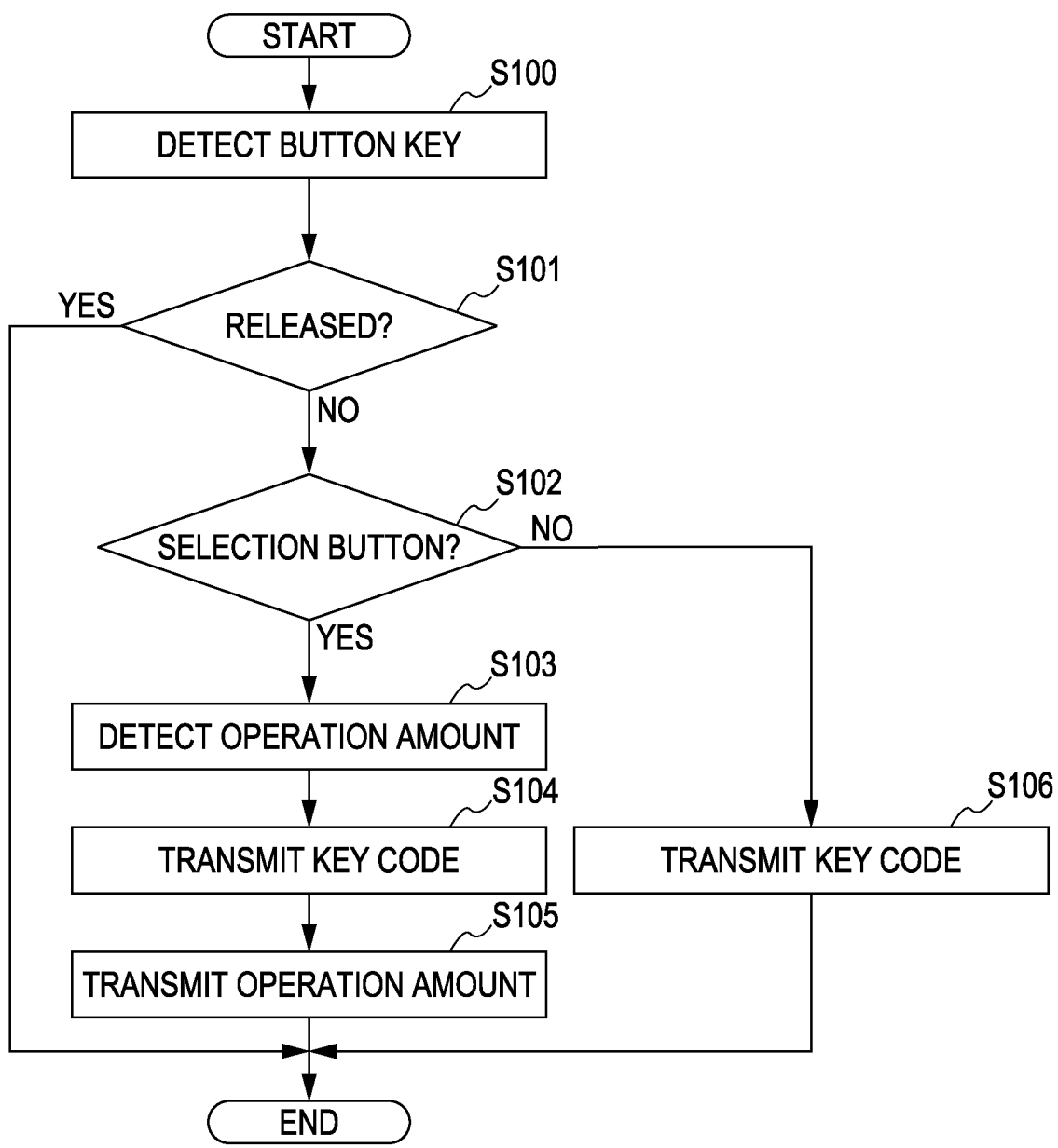
FIG. 6 is a flowchart of a process performed by an overall control unit included in a remote controller.

FIG. 6 is a flowchart of a process performed by the overall control unit 32 included in the remote controller 2. A process performed by the overall control unit 32 when the button of the remote controller 2 is pressed will be described with reference to FIG. 6.

In step S100, the overall control unit 32 detects the pressing of a button key based on signals transmitted from the content selection unit 30 and the operation input unit 34. In step S101, the overall control unit 32 detects whether the pressing of a button has been released. If the pressing of the button is released, signals are not transmitted from the content selection unit 30 and the operation input unit 34 to the overall control unit 32. Accordingly, the overall control unit 32 can detect that the pressing of the button has been released. After detecting that the pressing of the button has been released, the overall control unit 32 terminates the process illustrated in FIG. 6 and is then in a standby state. If the overall control unit 32 does not detect the release of the button, the process proceeds to step S102.

In step S102, the overall control unit 32 determines whether the pressed button is a content selection button based on the button key detected in step S100. If the pressed button is not a content selection button, the process proceeds to step S106. If the pressed button is a content selection button, the process proceeds to step S103.

The process from step S103 to step S105 is performed after a content selection button has been pressed. In step S103, the overall control unit 32 receives information about the amount of operation from the operation amount detection unit 31. In step S104, the overall control unit 32 transmits a key code identifying selected content to the communication control unit 33. In step S105, the overall control unit 32 transmits the information about the amount of operation to the communication control unit 33.

The processing of step S106 is performed after an operation button other than the content selection button has been pressed. In step S106, the overall control unit 32 transmits a key code to the communication control unit 33. If the communication control unit 33 receives the key code and/or the information about the amount of operation from the overall control unit 32, the communication control unit 33 transmits it or them to the television receiver 1 as an operation command (operation information).

[Content Image Combining Process Performed by Television Receiver 1]

Figure 7:
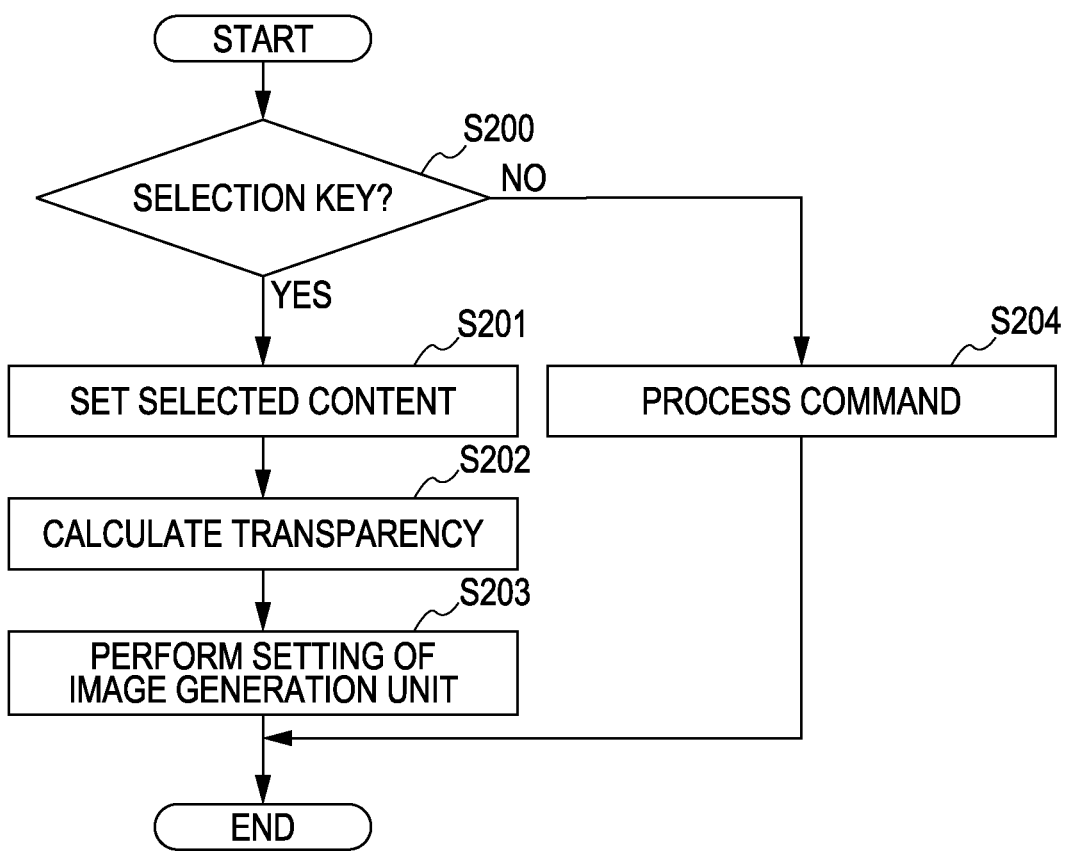
FIG. 7 is a flowchart of a content image combining process according to the first embodiment.

FIG. 7 is a flowchart of a content image combining process according to the first embodiment. A content image transparency blending process, which is performed by the television receiver 1 in response to an operation command transmitted from the remote controller 2, will be described with reference to FIG. 7.

In step S200, the overall control unit 18 determines whether an operation command received via the communication control unit 17 is a content selection key. If the received operation command is not a content selection key, the process proceeds to step S204. If the received operation command is a content selection key, the process proceeds to step S201. For example, if the operation command received via the communication control unit 17 includes information about the amount of operation and a key code, the overall control unit 18 determines that the received operation command is a content selection key.

In step S201, the overall control unit 18 specifies the input of corresponding content in accordance with the key code. In step S202, the overall control unit 18 transmits the information about the amount of operation received via the communication control unit 17 to the output attribute control unit 20 and then receives from the output attribute control unit 20 the calculation result of a transparency.

In step S203, the overall control unit 18 transmits information about a content image to be combined and the transparency for the content image to the image generation unit 21. The image generation unit 21 performs transparency blending processing based on the information and the transparency so as to generate image data (an output image). The display control unit 14 displays an image on the display panel 15 based on the image data while controlling the display panel 15.

On the other hand, in step S204, the overall control unit 18 performs necessary processing in accordance with the key code. For example, if the key code denotes power off, the overall control unit 18 powers off the television receiver 1. For example, if the key code denotes sound volume control, the overall control unit 18 controls the volume of sound output from a speaker (not illustrated) of the television receiver 1.

By performing the above-described process, a content image corresponding to a content selection button pressed by a viewer can be superimposed on a content image being viewed in accordance with a transparency.

In this embodiment, description has been made using a broadcast channel selection button functioning as a content selection button and an input switching button for switching among pieces of content input from an external input terminal. However, the content selection button may be any button allowing selection of content, for example, an enter button used for channel selection from an electronic program guide. Each channel selection button may be used to select one of private pieces of content such as household pictures or photographs.

As described previously, according to this embodiment, by just pressing a content selection button, a selected content image can be superimposed on a content image being viewed in accordance with a transparency desired by a viewer without interrupting viewing of the current content image.

Accordingly, an easy operation for selecting a piece of content while viewing another piece of content can be achieved.

Second Embodiment

A display system according to this embodiment includes the television receiver 1 and the remote controller 2 with a content selection button including a pressure sensor. The television receiver 1 simultaneously displays two content images without overlapping them.

A display system according to this embodiment changes the display size of a selected content image in accordance with the pressing amount of the content selection button which is detected by the pressure sensor. Furthermore, if the pressing amount of the content selection button is not changed within a period of time, a display system according to this embodiment maintains a screen layout and displays two images at the same time.

Example of Changing Display Size of Selected Content Image

Figure 8:
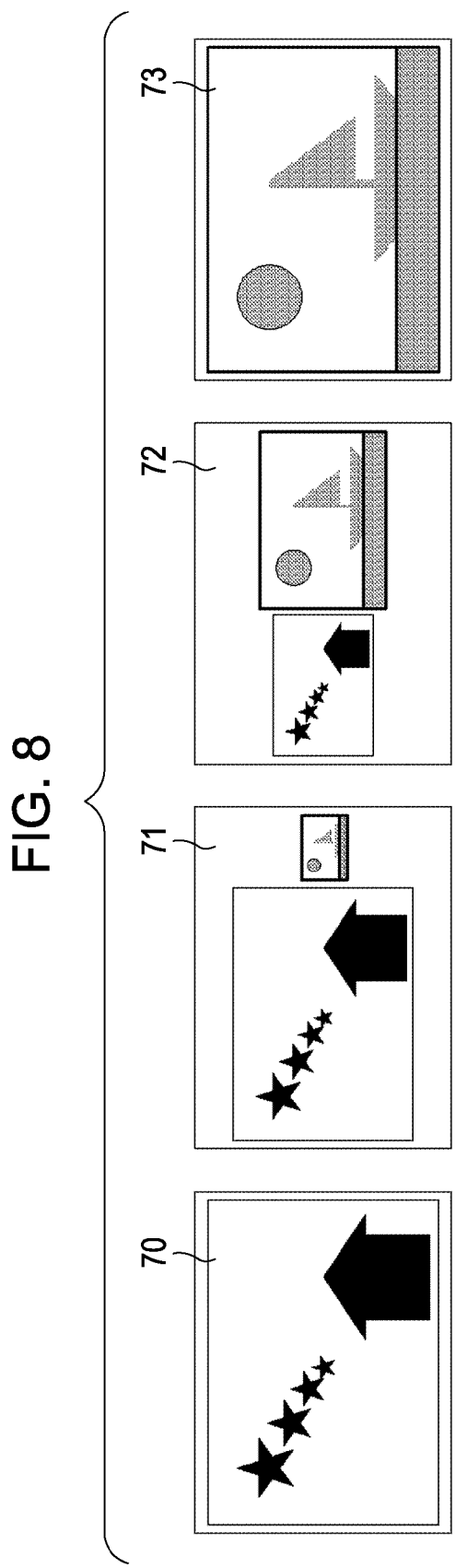
FIG. 8 is a diagram illustrating the transition of a display screen of a television receiver which is occurred in accordance with the change in the pressing amount of a content selection button.

First, exemplary screens of the television receiver 1 which are displayed when the display size of selected content is changed will be described. FIG. 8 is a diagram illustrating the transition of a display screen of the television receiver 1 which is occurred in accordance with the change in the pressing amount of the content selection button.

An image 70 illustrates a state in which content being viewed is displayed on a display screen. An image 71 illustrates a state of the display screen when a content selection button for content different from the content being viewed is pressed lightly in the state of the image 70. In the state of the image 71, a content image being viewed and a specified content image are simultaneously displayed in different areas on the display screen.

An image 72 illustrates a state of the display screen when the content selection button is further pressed from the state of the image 71. The display area of the specified content image becomes larger than that displayed in the image 71. If the pressing of the content selection button is eased in the state of the image 72, the display area of the specified content image becomes smaller.

An image 73 illustrates a state of the display screen when the content selection button is further pressed from the state of the image 72 so as to perform selection of the specified content image. In the state of the image 73, the selected content image is displayed instead of the content image displayed in the images 70 to 72. This operation corresponds to a channel selection operation of a television receiver in the related art.

If the pressing of the content selection button is released in the state of the image 71 or 72, the state of the display is back to the state of the image 70 in which only the content being viewed is displayed. If the pressing amount of the content selection button is not changed within a period of time set in advance in the state of the image 71 or 72, the screen layout of the image 71 or 72 is maintained even if the content selection button is released. Thus, by changing the state of a display screen in accordance with the pressing amount of the content selection button, selected content can be displayed as desired by a viewer.

Entire Configuration of Display System

The configurations of the television receiver 1 and the remote controller 2 included in a display system according to this embodiment and processes performed by the television receiver 1 and the remote controller 2 included in a display system according to this embodiment are the same as those described in the first embodiment, and the description thereof will be therefore omitted. The internal configuration (or function) of the television receiver 1 according to this embodiment will be described below with reference to FIG. 1.

The broadcast reception unit 10, the decoder 11, the external input interface 12, the image processing unit 13, the display control unit 14, and the display panel 15 are the same as those described in the first embodiment, and the description thereof will be therefore omitted. The overall control and the image generation performed by the television receiver 1 will be described below.

The operation input unit 16 receives an operation instruction input by a user. The operation input unit 16 includes various operation keys such as a power key, a channel selection key, and a volume control key and an input circuit. The communication control unit 17 communicates with the remote controller 2 using any communication method, for example, an infrared communication method or a wireless communication method. The overall control unit 18 includes a CPU, a ROM, and a RAM, and performs control processing of each unit included in the television receiver 1 in response to an instruction transmitted from the remote controller 2 via the communication control unit 17 or an instruction transmitted from the operation input unit 16.

The GUI generation unit 19 generates a graphic image for an operation GUI in response to an instruction transmitted from the overall control unit 18. The output attribute control unit 20 determines the output attribute of a content image. The output attribute control unit 20 receives from the overall control unit 18 information about the amount of operation detected by the operation amount detection unit 31 included in the remote controller 2, and calculates the display size of a corresponding content image in accordance with the information about the amount of operation.

In this embodiment, the output attribute control unit 20 increases the display size in proportion to the increase in the amount of operation, and changes the display position of a corresponding content image in accordance with the change in the display size. The output attribute control unit 20 calculates the display position so that the center of gravity of a content image is always at the same level as the center of gravity of a display screen. Furthermore, the output attribute control unit 20 calculates the display size and display position of a content image being viewed in accordance with the display size of a specified content image so as not to overlap the two content images. If the amount of operation is not changed within a period of time set in advance, the output attribute control unit 20 maintains an output attribute until a content selection button of the remote controller 2 is pressed. An appropriate margin may be provided for the amount of operation when the change in the amount of operation is determined. The output attribute control unit 20 transmits calculated output attributes to the overall control unit 18.

The image generation unit 21 generates image data to be used to display an image on a display panel by performing combining of a GUI image and a content image or combining of a plurality of content images based on the instruction and the output attribute of each content image which are transmitted form the overall control unit 18. For example, if the instruction transmitted from the overall control unit 18 is an instruction to display the broadcast input A, the image generation unit 21 selects image data corresponding to the broadcast input A from among outputs of the image processing unit 13 so as to generate image data. For example, if an instruction to display the broadcast input A and the broadcast input B is transmitted from the overall control unit 18 while the broadcast input A is displayed, the image generation unit 21 selects video data corresponding to the broadcast input A and video data corresponding to the broadcast input B from among the outputs of the image processing unit 13. Subsequently, the image generation unit 21 reduces the size of each of images corresponding to the broadcast inputs to a specified display size and places each of the images at a specified position so as to generate image data capable of preventing overlapping of the two images.

Content Image Combining Process Performed by Television Receiver 1

Figure 9:
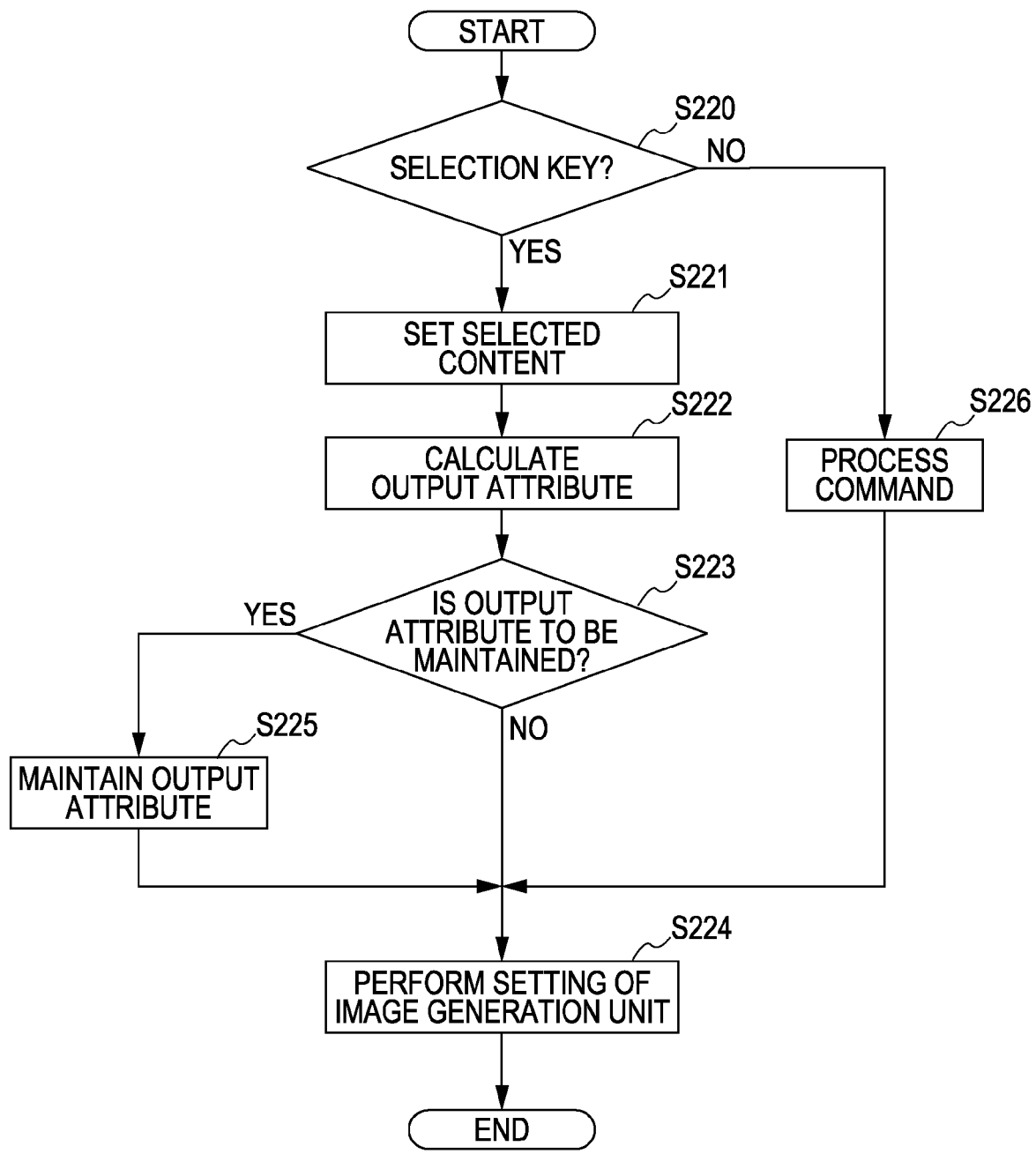
FIG. 9 is a flowchart of a content image combining process according to a second embodiment.

FIG. 9 is a flowchart of a content image combining process according to the second embodiment. A content image combining process, which is performed by the television receiver 1 in response to an operation command transmitted from the remote controller 2, will be described with reference to FIG. 9.

In step S220, the overall control unit 18 determines whether an operation command received via the communication control unit 17 is a content selection key. If the received operation command is not a content selection key, the process proceeds to step S226. If the received operation command is a content selection key, the process proceeds to step S221. For example, if the operation command received via the communication control unit 17 includes information about the amount of operation and a key code, the overall control unit 18 determines that the received operation command is a content selection key. In step S221, the overall control unit 118 specifies the input of corresponding content in accordance with the key code.

In step S222, the overall control unit 18 transmits the information about the amount of operation received via the communication control unit 17 to the output attribute control unit 20. The output attribute control unit 20 calculates the display sizes and display positions of specified content and content being viewed. Furthermore, the output attribute control unit 20 determines whether the amount of operation has been changed within a period of time set in advance. If the amount of operation has not been changed within the period of time set in advance, the output attribute control unit 20 notifies the overall control unit 18 that output attributes are to be maintained. If the amount of operation has been changed within the period of time set in advance, the output attribute control unit 20 notifies the overall control unit 18 of the calculated output attributes.

In step S223, the overall control unit 18 determines whether the notification transmitted from the output attribute control unit 20 is that output attributes are to be maintained. If the notification that output attributes are to be maintained is transmitted from the output attribute control unit 20 to the overall control unit 18, the process proceeds to step S225. If the notification of the calculated output attributes is transmitted from the output attribute control unit 20 to the overall control unit 18, the process proceeds to step S224.

In step S224, the overall control unit 18 transmits information about content images to be combined and the output attributes of the content images to the image generation unit 21. The image generation unit 21 performs content image combining processing based on the information and the output attributes so as to generate image data. The display control unit 14 displays an image on the display panel 15 based on the generated image data while controlling the display panel 15.

In step S225, the overall control unit 18 maintains current output attributes and uses these output attributes for the setting of the image generation unit 21. The maintained output attributes continue to be maintained until new output attributes are transmitted from the output attribute control unit 20. In step S226, the overall control unit 18 performs necessary processing in accordance with the key code.

By performing the above-described process, a content image corresponding to a content selection button pressed by a viewer can be changed in display size, and a content image being viewed and the selected content image can be displayed without overlapping. Furthermore, if the pressing amount of a content selection button is not changed within a predetermined period of time, a screen layout is maintained. As a result, two images can be simultaneously displayed.

As described previously, according to this embodiment, by just pressing a content selection button, a selected content image can be changed in display size and then be displayed without interrupting current viewing. Accordingly, an easy operation for selecting a piece of content while viewing another piece of content can be achieved.

Figure 10:
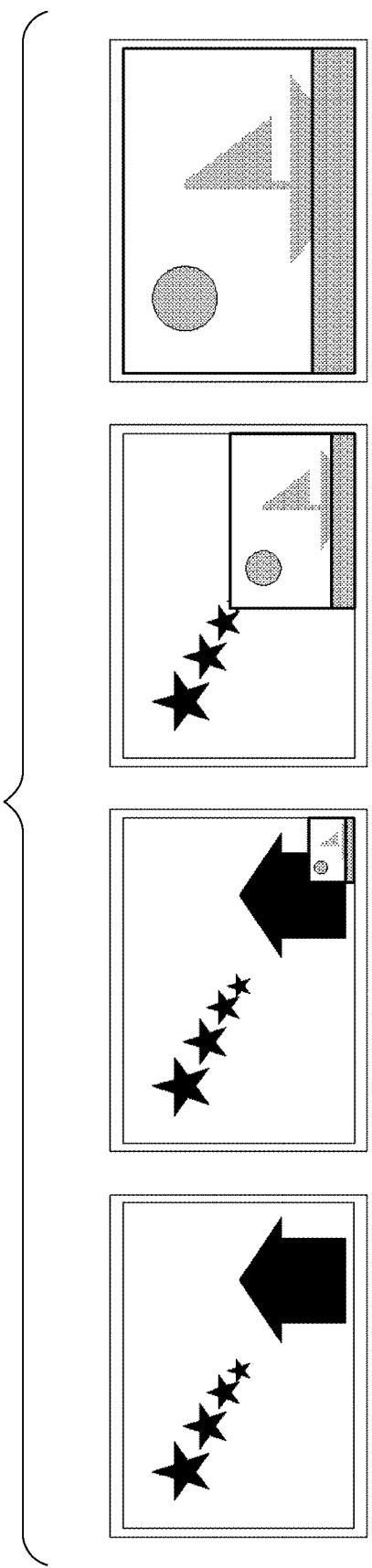
FIG. 10 is a diagram illustrating the change in display size of a selected content image when a picture-in-picture function is selected.

If the picture-in-picture function is used, the display size of a selected content image can also be changed. FIG. 10 is a diagram illustrating the change in display size of a selected content image when the picture-in-picture function is selected. By changing processes according to this embodiment of the output attribute control unit 20 and the image generation unit 21, as illustrated in FIG. 10, a selected content image can be changed in display size and then be superimposed on a content image being viewed.

Third Embodiment

A display system according to this embodiment includes the television receiver 1 and the remote controller 2 with a content selection button including a pressure sensor. The television receiver 1 simultaneously outputs two images and sound when outputting two pieces of content.

A display system according to this embodiment changes the sound volume of selected content in accordance with the pressing amount of the content selection button detected by the pressure sensor, and superimposes sound of selected content on sound of content being viewed.

[Example of Changing Sound Volume of Selected Content]

In this embodiment, the state of a display screen is changed as described in the second embodiment, and the description thereof will be therefore omitted. An example of the output of the television receiver 1 when the sound volume of selected content is changed will be described below.

FIG. 11 is a diagram illustrating an example of a table providing the relationship between the pressing amount of a content selection button and the output sound volume ratio between content being viewed and selected content. If the amount of operation falls within the range of 0.0 to a value smaller than 0.1, only sound of the content being viewed is output. If the amount of operation falls within the range of 0.1 to a value smaller than 0.3 when the content selection button is pressed, sound of the content being viewed and sound of the specified content are mixed and are then output. At that time, the output sound volume ratio between the content being viewed and the specified content is 80% to 20%.

In each range of the amount of operation, sound of one of two pieces of content and sound of the other one are mixed at a corresponding ratio. If the pressing of the content selection button is released when the amount of operation is less than 0.9, a television receiver outputs only sound of the content being viewed. If the amount of operation falls within the range of 0.9 to 1.0, the specified content is selected and only sound of the specified content is output.

[Overall Configuration of Display System]

Figure 12:
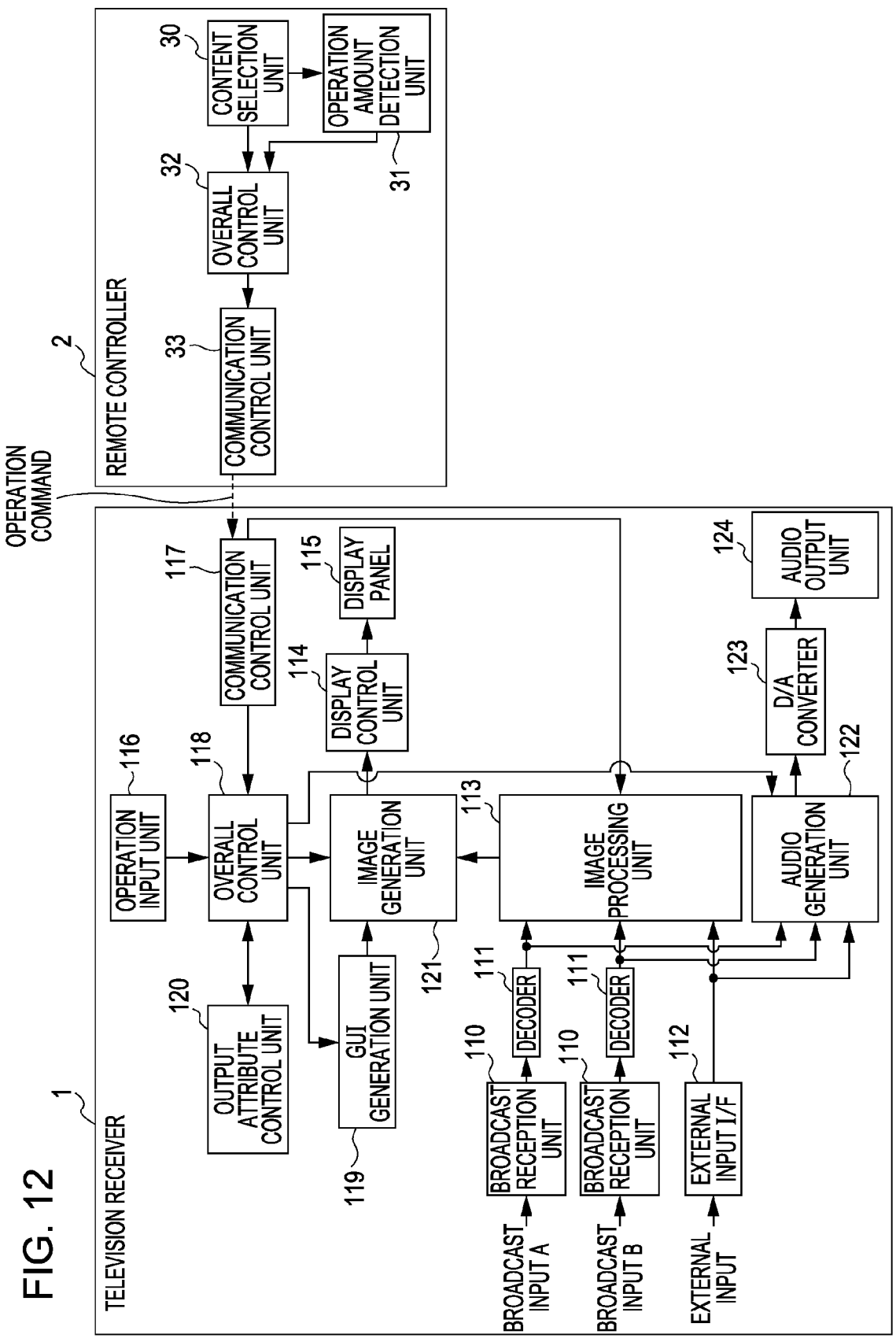
FIG. 12 is a block diagram illustrating an example configuration of a display system according to a third embodiment.

The configuration of the remote controller 2 included in a display system according to this embodiment and a process performed by the remote controller 2 included in a display system according to this embodiment are the same or similar as those described in the above-described embodiments, and the description thereof will be therefore omitted. The internal configuration (or function) of the television receiver 1 according to this embodiment will be described below with reference to FIG. 12. FIG. 12 is a block diagram illustrating the configuration of a display system according to the third embodiment.

A broadcast reception unit 110, a decoder 111, an external input interface 112, an image processing unit 113, a display control unit 114, and a display panel 115 are the same or similar as the broadcast reception unit 10, the decoder 11, the external input interface 12, the image processing unit 13, the display control unit 14, and the display panel 15, respectively, and the description thereof will be therefore omitted. A digital-to-analog converter 123 converts input audio data into an analog signal. An audio output unit 124 includes a speaker, an amplifier, and an audio signal output terminal.

The overall control, the image generation, and the sound generation performed by the television receiver 1 will be described below. An operation input unit 116 receives an operation instruction input by a user. The operation input unit 116 includes various operation keys such as a power key, a channel selection key, and a volume control key and an input circuit. A communication control unit 117 communicates with the remote controller 2 using any communication method, for example, an infrared communication method or a wireless communication method. An overall control unit 118 includes a CPU, a ROM, and a RAM, and performs control processing of each unit included in the television receiver 1 in response to an instruction transmitted from the remote controller 2 via the communication control unit 117 or an instruction transmitted from the operation input unit 116.

A GUI generation unit 119 generates a graphic image for an operation GUI in response to an instruction transmitted from the overall control unit 118. An output attribute control unit 120 determines the output attribute of a content image. The output attribute control unit 120 receives from the overall control unit 118 information about the amount of operation detected by the operation amount detection unit 31 included in the remote controller 2, and changes the display size and sound volume of a corresponding content image in accordance with the information about the amount of operation. In this embodiment, the output attribute control unit 120 calculates the sound volume of content in accordance with audio output characteristics illustrated in FIG. 11. The display size and display position of a content image are determined as described in the second embodiment. The output attribute control unit 120 transmits calculated output attributes to the overall control unit 118.

An image generation unit 121 generates image data used to display an image on a display panel by performing combining of a GUI image and a content image or combining of a plurality of content images based on the instruction and the output attribute of each content image which are transmitted from the overall control unit 118. An audio generation unit 122 mixes a plurality of content audio inputs based on the instruction and the output attribute of sound of each content image which are transmitted from the overall control unit 118, and outputs the mixing result to an audio output unit 124.

[Content Sound Mixing Process Performed by Television Receiver 1]

Figure 13:
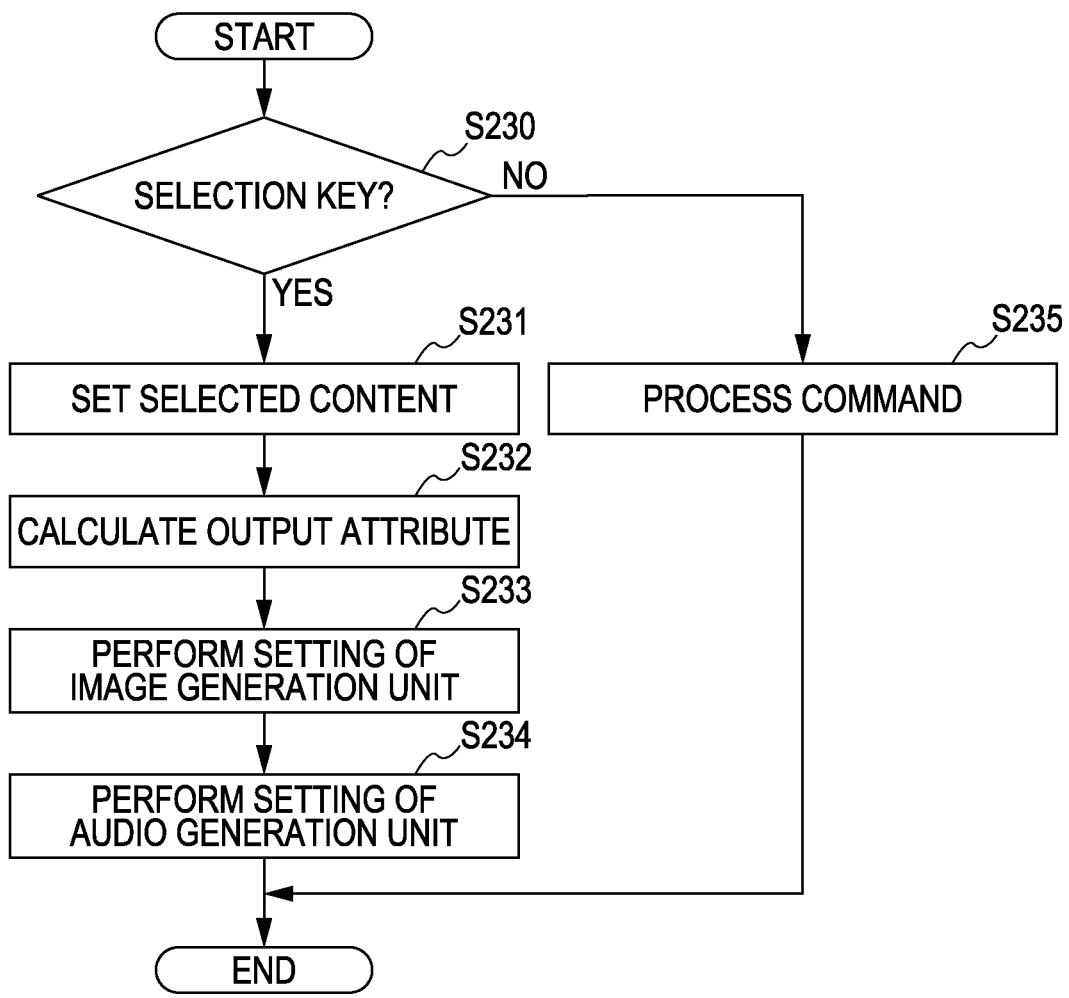
FIG. 13 is a flowchart of a content sound mixing process.

FIG. 13 is a flowchart of a content sound mixing process. A content sound mixing process, which is performed by the television receiver 1 in response to an operation command transmitted from the remote controller 2, will be described with reference to FIG. 13.

In step S230, the overall control unit 118 determines whether an operation command received via the communication control unit 117 is a content selection key. If the received operation command is not a content selection key, the process proceeds to step S235. If the received operation command is a content selection key, the process proceeds to step S231. For example, if the operation command received via the communication control unit 117 includes information about the amount of operation and a key code, the overall control unit 118 determines that the received operation command is a content selection key.

In step S231, the overall control unit 118 specifies the input of corresponding content in accordance with the key code. In step S232, the overall control unit 118 transmits the information about the amount of operation received via the communication control unit 117 to the output attribute control unit 120. The output attribute control unit 120 calculates the output sound volumes, display sizes, and display positions of specified content and content being viewed, and outputs the calculation results to the overall control unit 118.

In step S233, the overall control unit 118 transmits information about content images to be combined and the output attributes of the content images to the image generation unit 121. The image generation unit 121 performs content image combining processing based on the information and the output attributes so as to generate image data. The display control unit 114 displays an image on the display panel 115 based on the generated image data while controlling the display panel 115.

In step S234, the overall control unit 118 transmits information about content sound inputs to be mixed and the output attributes of the content sound inputs to the audio generation unit 122. The audio generation unit 122 performs audio mixing processing based on the information and the output attributes so as to generate audio data (output sound). The audio data is converted into an analog signal by the digital-to-analog converter 123 and is then output to the audio output unit 124. In step S235, the overall control unit 118 performs necessary processing in accordance with the key code.

By performing the above-described process, the sound of content corresponding to a content selection button pressed by a viewer can be changed in volume and then be simultaneously output with the sound of content being viewed.

As described previously, according to this embodiment, by just pressing a content selection button, the sound of selected content can be changed in volume as desired by a viewer and then be output without interrupting current viewing. Accordingly, an easy operation for selecting a piece of content while viewing another piece of content can be achieved.

The above-described processes according to the first to third embodiments may be optionally combined. The configurations of the content selection unit 30 and the operation amount detection unit 31 which are included in the remote controller 2 are not limited to those illustrated in FIG. 2, and may be any configurations allowing the detection of the amount of operation.

For example, in order to detect the amount of operation, the pressing duration of a button can be used. In this case, the pressing duration of a channel selection button is detected as the amount of operation, and the output attribute of content specified by the channel selection button is changed in accordance with the detected amount of operation. As a result, like the above-described embodiments, the following effects can be obtained. That is, by just pressing a content selection button, selected content can be displayed as desired by a viewer without interrupting current viewing. Accordingly, an easy operation for selecting a piece of content while viewing another piece of content can be achieved.

A multistage button with a plurality of contact points which is capable of being pressed in stages may be used. In this case, the number of stages of pressing is detected as the amount of operation, and content is output using an output attribute that is determined in accordance with the number of stages of pressing. As a result, like the above-described embodiments, the following effects can be obtained. That is, by just pressing a content selection button, selected content can be displayed as desired by a viewer without interrupting current viewing. Accordingly, an easy operation for selecting a piece of content while viewing another piece of content can be achieved.

Other Embodiments

The functions of the above-described embodiments can be achieved as follows. That is, a storage medium (or recording medium) recording the program code of software capable of achieving the functions of the above-described embodiments is provided for a system or an apparatus. The computer (CPU or MPU) of the system or apparatus reads out the program code from the storage medium and executes the read program code. In this case, the program code itself read out from the storage medium achieves the functions of the above-described embodiments. Accordingly, the present invention can be applied to the storage medium storing the program code.

An OS (Operating System) or the like running on the system or apparatus may perform a part of or all of the processing in response to the instructions of the program code read out by the computer of the system or apparatus.

Furthermore, the program code read out from the storage medium may be written in the memory of a function expansion card inserted into the system or apparatus or a function expansion unit connected to the system or apparatus. In this case, a CPU included in the function expansion card or the function expansion unit may perform a part of or all of the processing in response to the instructions of the program code so as to achieve the functions of the above-described embodiments.

If the present invention is applied to the above-described storage medium, program codes corresponding to the above-described flowcharts are stored in the storage medium.

According to the above-described embodiments, by just pressing a content selection button, the display setting of selected content can be continuously changed. Consequently, the selected content can be displayed as desired by a viewer without interrupting current viewing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-292358 filed Nov. 9, 2007, which is hereby incorporated by reference herein in its entirety.

What is claimed is:

1. A display apparatus comprising:
a reception unit configured to receive, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;
a determination unit configured to determine a transparency amount to be applied to content, wherein, in response to receiving the operation amount information, the determination unit uses the operation amount information, obtained as part of the one selection operation that results in obtaining the content identification information, to determine the transparency amount to be applied to the content that corresponds to the content identification information;
an output image generation unit configured to generate a first output image and, by applying the transparency amount to content that corresponds to the content identification information, generate a second output image; and
a display control unit configured to display output from the output image generation unit on a display screen.

2. A display control method of a display apparatus, the display control method comprising:
receiving, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;
determining a transparency amount to be applied to content, wherein, in response to receiving the operation amount information, determining includes using the operation amount information, obtained as part of the one selection operation that results in obtaining the content identification information, to determine the transparency amount to be applied to the content that corresponds to the content identification information;
generating a first output image and, by applying the transparency amount to content that corresponds to the content identification information, generating a second output image; and
displaying the generated output on a display screen.

3. A display apparatus comprising:
a reception unit configured to receive, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;
a determination unit configured to determine a display size amount to be applied to content, wherein, in response to receiving the operation amount information, the determination unit uses the operation amount information, obtained as part of the one selection operation that results in obtaining the content identification information, to determine the display size amount to be applied to the content that corresponds to the content identification information;

an output image generation unit configured to generate a first output image and, by applying the display size amount to content that corresponds to the content identification information, generate a second output image; and a display control unit configured to display output from the output image generation unit on a display screen.

4. A display apparatus comprising:

a reception unit configured to receive, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;

a determination unit configured to determine a display position amount to be applied to content, wherein, in response to receiving the operation amount information, the determination unit uses the operation amount information, obtained as part of the one selection operation that results in obtaining the content identification information, to determine the display position amount to be applied to the content that corresponds to the content identification information;

an output image generation unit configured to generate a first output image and, by applying the display position amount to content that corresponds to the content identification information, generate a second output image; and a display control unit configured to display output from the output image generation unit on a display screen.

5. A display apparatus comprising:

a reception unit configured to receive, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;

a determination unit configured to determine a output attribute amount to be applied to content, wherein, in response to receiving the operation amount information, the determination unit uses the operation amount information, obtained as part of the one selection operation that results in obtaining the content identification information, to determine the output attribute amount to be applied to the content that corresponds to the content identification information;

an output image generation unit configured to generate a first output image and, by applying the output attribute amount to content that corresponds to the content identification information, generate a second output image;

an output sound generation unit configured to generate output sound related to the selected content based on the output attribute determined by the determination unit;

a display control unit configured to display output from the output image generation unit on a display screen; and a sound output unit configured to output the output sound generated by the output sound generation unit.

6. A display control method of a display apparatus, the display control method comprising:

receiving, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;

determining a display size amount to be applied to content, wherein, in response to receiving the operation amount information, wherein determining includes using the operation amount information, obtained as part of the one selection operation that results in obtaining the content identification information, to determine the display size amount to be applied to the content that corresponds to the content identification information;

generating a first output image and, by applying the display size amount to content that corresponds to the content identification information, generating a second output image; and displaying the generated output on a display screen.

7. A display control method of a display apparatus, the display control method comprising:

receiving, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;

determining a display position amount to be applied to content, wherein, in response to receiving the operation amount information, wherein determining includes using the operation amount information, obtained as part of the one selection operation that results in obtaining the content identification information, to determine the display position amount to be applied to the content that corresponds to the content identification information;

generating a first output image and, by applying the display position amount to content that corresponds to the content identification information, generate a second output image; and displaying the generated output on a display screen.

8. A display control method of a display apparatus, the display control method comprising:

receiving, from a remote controller located remote from the display apparatus and having a selection member, a remote controller instruction that includes content identification information, obtained from one selection operation of the selection member, and operation amount information of the selection member, wherein the operation amount information is based on amount of operation applied to the selection member during the one selection operation of the selection member that results in obtaining the content identification information;

determining a output attribute amount to be applied to content, wherein, in response to receiving the operation amount information, wherein determining includes using the operation amount information, obtained as part of the one selection operation that results in obtaining the content identification information, to determine the output attribute amount to be applied to the content that corresponds to the content identification information;

generating a first output image and, by applying the output attribute amount to content that corresponds to the content identification information, generating a second output image;

generating output sound related to the selected content based on the determined output attribute;

displaying the generated output on a display screen; and outputting the generated output sound.

9. The display apparatus according to claim 1, wherein the operation amount information corresponds to an amount of pressure applied to the selection member, a number of pressing stages of the selection member, or a pressing duration of the selection member.

10. The display apparatus according to claim 1, wherein, when the first output image is being displayed on the display screen, the display control unit performs display control processing to superimpose the second output image on the first output image which is content being viewed.

11. The display apparatus according to claim 1, wherein, in response to transparency determinations performed by the determination unit, the display control unit causes transparency of the output on the display screen to vary as the amount of operation applied to the selection member varies during the one selection operation that results in obtaining the content identification information.

12. The display apparatus according to claim 11, wherein, when the operation amount information is less a predetermined threshold value and greater than a minimum value, the display control unit simultaneously displays the first output image and the second output image.

13. The display apparatus according to claim 12, wherein, when the operation amount information is equal to the minimum value, the display control unit displays the first output image instead of simultaneously displaying the first output image and the second output image.

14. The display apparatus according to claim 11, wherein, when the operation amount information is greater than a predetermined threshold value, the determination unit determines that the received content identification information is selected content identification information and the display control unit displays the second output image instead of displaying the first output image or simultaneously displaying the first output image and the second output image.

15. The display apparatus according to claim 14, wherein the operation amount information is configured to range from 0 to 1.0 and the predetermined threshold value is less than 1.0.

16. The display apparatus according to claim 1, further comprising a memory storing relationship information that provides a relationship between operation amount information and transparency amount, wherein, in response to receiving the operation amount information, the determination unit uses the relationship information and the operation amount information, obtained as part of the one selection operation that results in obtaining the content identification information, to determine the transparency amount to be applied to the content that corresponds to the content identification information.

17. The display apparatus according to claim 1, wherein the determination unit controls the transparency amount such that the display control unit superimposes the second output image on the first output image to provide viewing of the second output image without interrupting viewing of the first output image.

18. The display apparatus according to claim 17, wherein, to display the second output image, the determination unit changes the transparency amount of the second output image in accordance with a pressing amount of pressure applied to the selection member, wherein the pressing amount of pressure is included as the operation amount information in the remote controller instruction received by the reception unit.

19. The display apparatus according to claim 17, wherein, in superimposing the second output image on the first output image, display size and display position of the first output image and the second output image are the same to work towards maintaining realism in displaying the first output image and the second output image.

20. The display apparatus according to claim 1, wherein the received content identification information is information that specifies a content selection key, and wherein at least one of the first output image and the second output image is video data.

* * * * *